June 23, 1964  A. M. RUBIO  3,138,491
COMBINATION SWITCH AND BATTERY HOLDER
Filed April 9, 1962  2 Sheets-Sheet 2
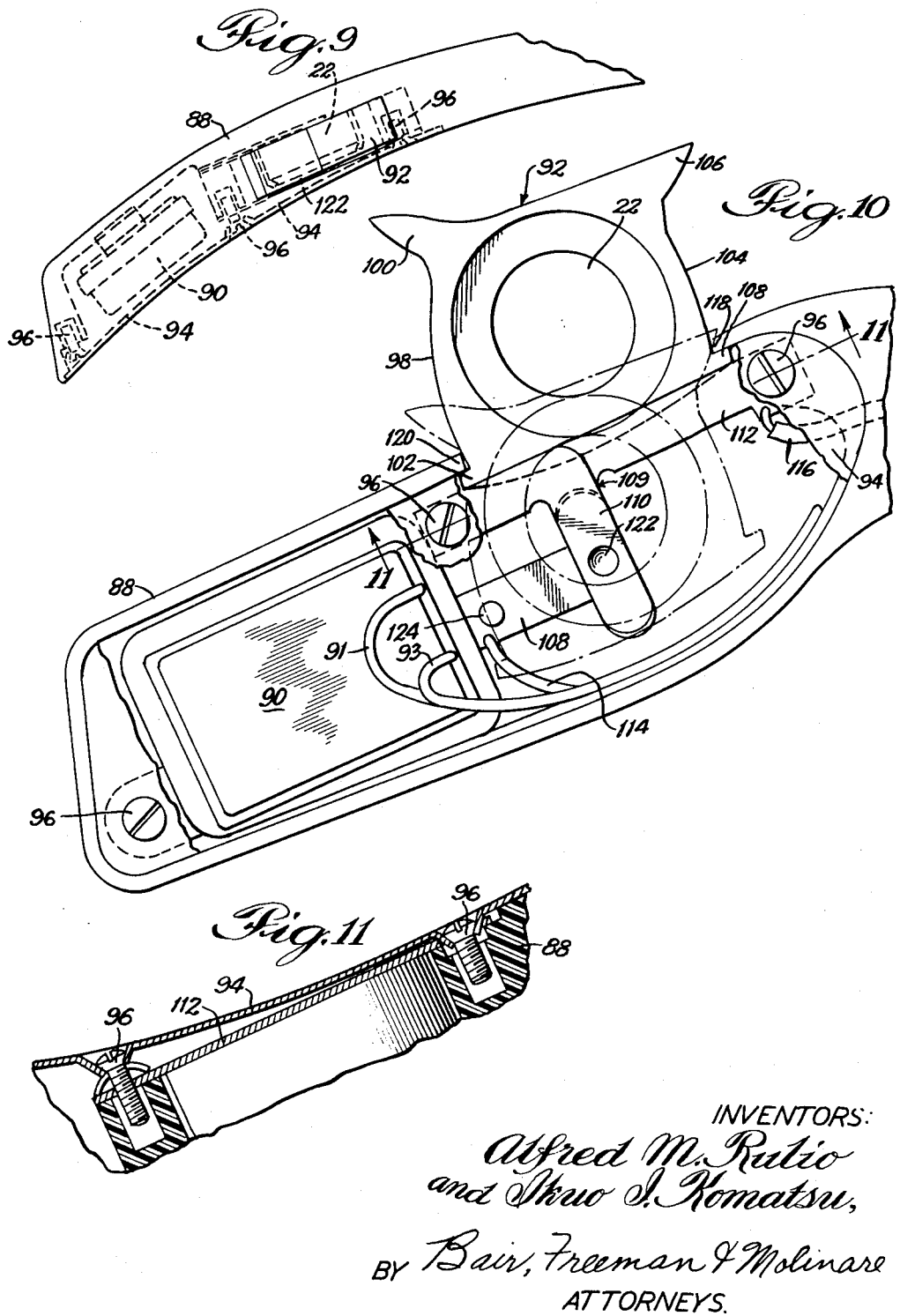
INVENTORS:
Alfred M. Rubio
and Ikuo J. Komatsu,
BY Bair, Freeman & Molinare
ATTORNEYS.

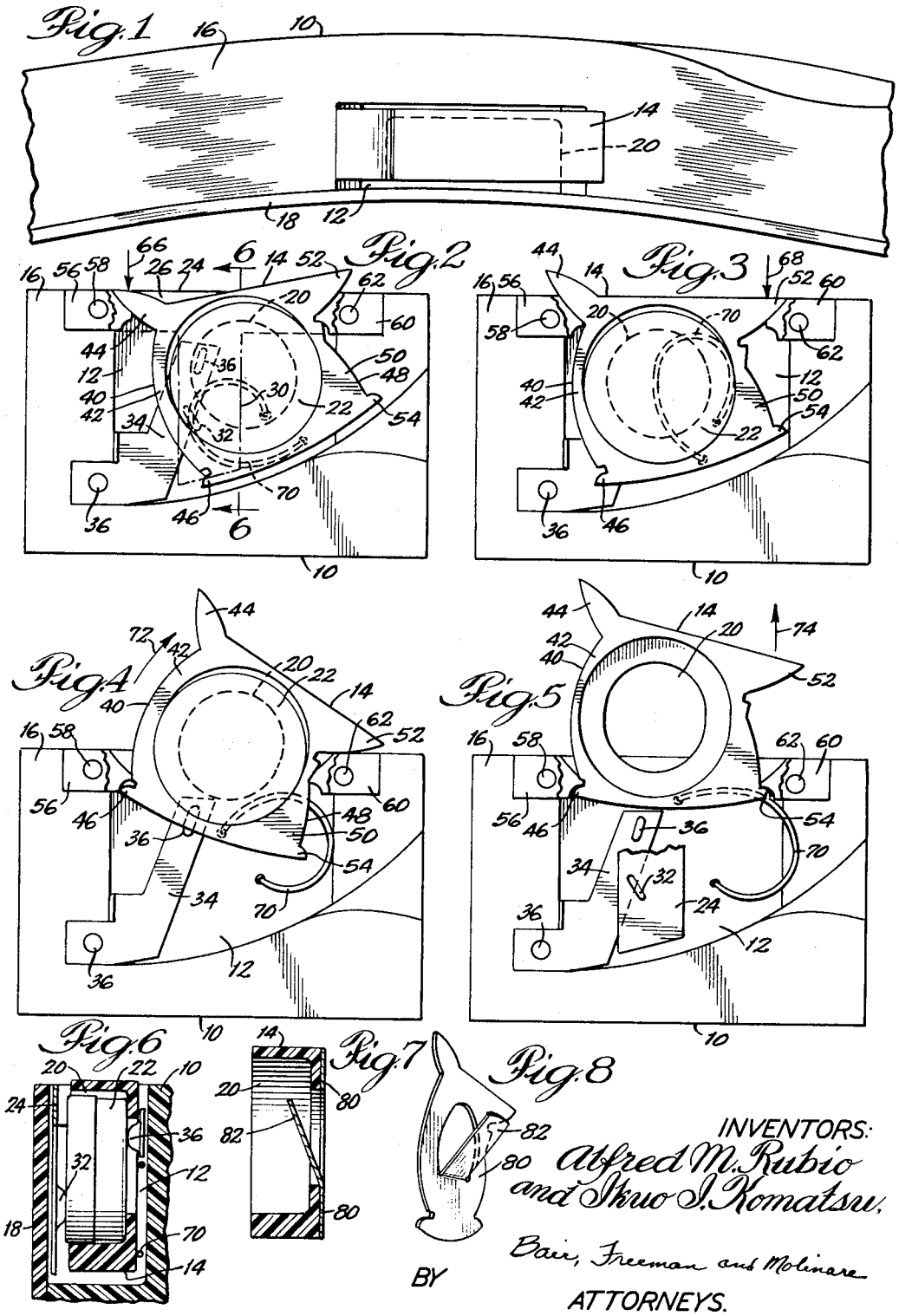

United States Patent Office 3,138,491
Patented June 23, 1964

3,138,491
COMBINATION SWITCH AND BATTERY HOLDER
Alfred M. Rubio and Ikuo I. Komatsu, Chicago, Ill., assignors to Beltone Electronics Corporation, a corporation of Illinois
Substituted for abandoned application Ser. No. 802,824, Mar. 30, 1959. This application Apr. 9, 1962, Ser. No. 188,296
2 Claims. (Cl. 136—173)

This invention relates generally to improvements in electrical switching apparatus, and more specifically to a novel combination switch and battery holder of the type having particular utility in hearing aids and other compact electrical apparatus.

There is an ever increasing trend towards miniaturization in many modern day electrical devices, as particularly manifested for example, in the field of hearing aids for the hard of hearing. Hearing aids are available today which are enclosed within the temple members of a pair of eyeglasses, and in a housing worn at the ear, with ultimate hearing aid being adapted to be fitted within the hidden passages of the ear.

Consequently, it can be appreciated that a need exists for very small and efficient components suitable for the miniaturized circuits used in devices of this type. It further can be appreciated that any savings in circuit components, or in the space required for such components, will contribute materially towards the achievement of satisfactory and marketable apparatus, such as extremely small hearing aids and the like.

In electrical apparatus of the prior art, it is a common practice to couple a power switch to the rotatable shaft of a volume control potentiometer. Those skilled in the art know that this practice has several disadvantages, including the frequently encountered problem that the movement of the volume control wiper over its resistance each time the apparatus is turned on and off results in the volume control becoming noisy, and sometimes, inoperative. Further, with such prior art constructions, the user of the apparatus is required to adjust the volume control to the desired level each time the apparatus is turned on. This is particularly troublesome in hearing aids since many hard of hearing persons are advanced in years and do not have a ful digital dexterity.

Accordingly, it is a general object of this invention to provide a new combination switch and battery holder which eliminates the above-described difficulties.

It is a further object of this invention to provide combination switch and battery holder apparatus particularly suited for use with hearing aids and other small electrical devices.

It is a still further object of this invention to provide a novel combination switch and battery holder which operates to clean the battery contacts each time the switch is turned on or off, thereby substantially reducing the occurrence of intermittent operation by maintaining the battery terminals and contacts in a clean condition.

It is another object of this invention to provide a new and improved switch for battery operated equipment which functions in combination with a battery holder, and which is completely independent of the operation of the equipment volume control.

It is still another object of this invention to provide a new and improved combination switch and battery holder for use in hearing aids in which the switch is push operated and is adapted for easy operation by persons advanced in years who possess limited digital dexterity.

It is still another object of this invention to provide a new and improved combination switch and battery holder, as described above, that is characterized by its simple and positive operation, its compactness, and it economy of construction and use.

These and other objects are realized in accordance with a specific illustrative embodiment of the invention, which advantageously takes the form of a battery holder adapted to be positioned within a recess in the housing of the electrical apparatus. In accordance with a feature of the invention, the battery holder has a central opening for receiving the battery such that one terminal of the battery is exposed at one side of the battery holder, and the other terminal of the battery is exposed at the opposite side of the battery holder. One of the circuit power contacts is disposed within the housing adjacent one wall of the recess and another circuit power contact is disposed within the housing adjacent the opposing wall of the recess. The dimensions and locations of the power contacts are such that when the battery holder is operatively positioned within the recess, it may be selectively operated to a circuit energizing position with both battery terminals engaging the power contacts, or to a circuit de-energizing position with at least one battery terminal disengaged from its power contact.

In addition to being selectively operable from energizing to non-energizing position within the recess, it is a feature of one embodiment of this invention that the battery holder also may selectively be raised out of the recess to facilitate battery replacement or alternatively be held in operative position within the recess. Thus, the battery holder may be positioned in any one of three static positions, namely, circuit on and off positions within the recess, and battery replacement position outside of the recess.

In accordance with a highly advantageous feature of another embodiment of the invention, the battery holder is positively maintained in each of its three static positions, or is aided in going from one static position to another by means of a single over-centered spring secured at one end to the lower portion of the battery holder and at its other end to one wall of the housing. The novel action of this over-centered spring maintains the battery holder in position within the recess when this is desired, maintains the battery holder out of the recess when battery replacement is effected and maintains the battery holder in its switch-on or switch-off position when such operation is desired.

It is a further feature of this invention to provide the battery holder with novel guide and locking means such that when the holder is raised out of the housing recess, it is locked to the housing so as not be separated therefrom. Further, in the embodiment comprising the over-centered spring, guide means are provided so that the holder may be raised and lowered with respect to the housing recess in a predetermined guided manner.

The above and other features of novelty which characterize the invention are pointed out with particularity in the claims annexed to and forming a part of this specification. For a better understanding of the invention, however, its advantages and specific objects attained with its use, reference is had to the accompanying drawing and descriptive material in which is shown and described an illustrative embodiment of the invention.

In the drawing:
FIGURE 1 is a fragmentary view of one type of eyeglass hearing aid temple member embodying the present invention;
FIGURES 2, 3, 4, and 5 are side elevational views, in cross-section, showing the various operating positions of one illustrative construction of a combination switch and battery holder embodying the invention and employing a single over-centered spring in accordance therewith;
FIGURE 6 is a cross-sectional view, taken substantially as shown on line 6—6 of FIGURE 2;

FIGURES 7 and 8 are cross-sectional and perspective views, respectively, of an alternative embodiment of the invention;

FIGURE 9 is a fragmentary view of a further type of eyeglass hearing aid temple member embodying the invention;

FIGURE 10 is a side elevational view, partly broken, showing the various operating positions of a further illustrative construction of a combination switch and battery holder embodying the invention; and FIGURE 11 is a cross-sectional view taken substantially as shown on the line 11—11 of FIGURE 10.

To facilitate an understanding of the invention, the combination switch and battery holder will be described as utilized in a temple member of an eyeglass-type hearing aid. Those skilled in the art will readily appreciate, however, that this particular description is for illustrative purposes only, and that the invention is in no way limited to use with hearing aids but finds equally advantageous employment with a large variety of other miniaturized electrical devices adapted for battery operation.

Referring now to the drawing, and more particularly to FIGURE 1 thereof, there is shown in fragmentary form, a portion of an eyeglass hearing aid temple member 10 formed with a recess 12 having a battery support disk 14 positioned therein. Advantageously, as shown in FIGURE 1, temple member 10 may comprise a main housing 16 having a cover plate 18 secured to one side thereof. Those skilled in the art will appreciate that in use, parts of the housing 16 of the temple member 10 will be hollow for receiving the component parts of the hearing aid such as a microphone, receiver and amplifier and the cover plate 18 is made easily removable so as to permit access to these components.

The recess 12 for the battery support disk 14 is defined at its bottom wall and three side walls by an opening formed in the housing 16, and the remaining side wall for recess 12 is defined by the cover plate 18. Accordingly, access to recess 12 is provided at the top opening of the recess, into which the battery support disk 14 is adapted to be inserted.

As shown in the drawing, the battery support disk 14 advantageously is provided with a central cavity 20 for receiving a battery 22, said central cavity being outwardly opened at one face thereof and having an opening extending into the cavity at the opposite face thereof. Thus, as clearly shown in FIGURES 6 and 7, cavity 20 of battery support disk 14 is cup-shaped with a relatively large battery receiving opening at one face and a relatively small aperture extending through the opposite face of the disk into the cavity.

Although the central cavity 20 may take any desired shape, advantageously the cavity is annular, as shown in the illustrative embodiments of the drawing, for receiving a circular battery 22. Battery 22 is of any type suitable for use with eyeglass hearing aids, and as shown in FIGURE 6, it may be of the type wherein the opposite flat faces of the battery form the battery terminals. Electrical contact between the battery terminals and the remainder of the hearing aid is made by means of a pair of power contacts secured to the body 16 so as to be in electrical contact with the terminals of battery 22 when the battery is placed in hearing aid operating position. Advantageously, one electrical contact 24 is provided with a horizontal arm 26 having its extremities secured to a housing 16 by suitable fasteners and a vertical arm 30 depending from the horizontal arm 26. Vertical arm 30 is provided with a dimple 32 adapted to electrically engage one terminal of the battery 22. The other power contact 34 is secured to the housing 16 at one end thereof by a suitable fastener 36 and the other end extends into cavity 20. Power contact 34 is provided with a dimple 36 adapted to electrically engage the opposite terminal of the battery 22.

In accordance with a feature of this invention, the battery support disk 14 is formed with a peripheral edge which is particularly contoured to define a plurality of peripherally spaced cam members. The cam member 40 at one peripheral edge of battery support disk 14 is formed with a curved central portion 42 having a finger ear 44 at one end thereof and a lock ear 46 at the other end thereof. The opposite peripheral edge 48 of the battery support disk 14 also is provided with a curved central portion 50 having a finger ear 52 at one end thereof and a lock ear 54 at the other end thereof.

In accordance with a further feature of this invention, a cam member 56 is secured to one wall of the recess 12, as by the fastener 58, and a similar cam member 60 is secured to the opposite wall of the recess 12, as by means of fastener 62. The cam members 56 and 60 are provided with upper cam surfaces adapted to cooperate with the finger ears 44 and 52, respectively, said upper cam surfaces being contoured to fit the contour of the finger ears, and lower cam surfaces adapted to cooperate with and fit the contours of the lock ears 46 and 54.

The operation of the combined switch and battery holder will now be described. When the disk 14 is positioned within the recess 12, the disk may be rocked or pivoted by means of the finger ears 44 and 52 to place the battery 22 in a switch-on or switch-off position. Thus, as shown in FIGURE 2 of the drawing, when the finger ear 44 is depressed, as shown by the arrow 66, the disk 14 is pivoted counter-clockwise so that finger ear 44 comes to rest against the upper cam surface of cam member 56. In this position, the dimple 36 of power contact 34 engages a terminal of battery 22, but the dimple 32 of power contact 24 is not in electrical engagement with the opposite terminal of battery 22. Accordingly, the switch is in the power-off position and the hearing aid is not energized.

When the disk 14 is pivoted to its opposite position by depressing finger ear 52 in the direction shown by the arrow 68, as indicated in FIGURE 3, the disk will be pivoted in a clockwise direction placing both power contacts into engagement with the battery terminals. Thus, in the position shown in FIGURE 3, the switch is in the battery-on condition, and the hearing aid will be energized.

In accordance with an important feature of the illustrative embodiment of the invention shown in FIGURES 2 through 6, the pivoting action of disk 14 is facilitated by means of a single over-centered spring 70 connected at one end thereof to the disk 14 and at the other end thereof to a wall of the recess 12. Due to the over-centered action of spring 70, the disk 14 will be held in a positive manner in either its battery-on or battery-off position when the disk is at rest, but when one of the finger ears is depressed, to change the switch from one condition to another, the action of the over-centered spring 70 aids the pivoting movement of the disk in a positive manner to facilitate the disk movement from one position to the other. When the disk has reached its other position, the spring once again serves to hold and maintain the disk in its new position until the switch is again actuated by the depression of the finger ears.

The over-centered spring 70 also serves to maintain disk 14 in its operating position within the recess 12, when this is desired, or to maintain disk 14 in a battery replacement position outside of the recess 12, when it is desired to check or replace the battery 22. Thus, as shown in FIGURE 4, disk 14 may be removed from the recess 12 by upward actuation of the finger ear 44, as indicated by the arrow 72. The over-centered spring 70 will aid in this operation by urging the disk 14 upwardly, and the disk is prevented from being totally removed from the recess 12 by means of the cooperating locking action of the lock ear 46 and the lower contoured surface of the cam member 56.

Those skilled in the art will appreciate that disk 14 may initially be removed from recess 12 in only one manner and direction, namely, the manner and direction illustrated in FIGURE 4 of the drawing. Disk 14 cannot initially be removed from recess 12 by the upward actuation of finger ear 52 since the locking action of the cam member 60 and the cammed peripheral edge 48 of the disk prevents the disk from being removed in this manner. However, when the finger ear 44 of the disk 14 is fully removed from the recess 12 and the disk is locked by the lock member 46, the over-centered spring 70 then permits the finger ear 52 to be actuated, as indicated by the arrow 74, to fully elevate the disk 14 into the battery replacement position shown in FIGURE 5.

Thus, the cooperating actions of the over-centered spring 70, the cam surfaces of the disk 14 and cam members 56 and 60 permit a single predetermined sequence of movements for the disk 14 when the latter is removed from recess 12 into the battery replacement position. As stated above, the first step in this removal of disk 14 consists in the upward actuation of finger ear 44 until the lock ear 46 engages the cam member 56. Then, and only then, the finger ear 52 is actuated upwardly, as indicated by the arrows 74, to elevate disk 14 out of the recess 12 until the lock ear 54 engages the cam member 60. This unique and highly advantageous action of the disk 14 is aided by the single over-centered spring 70 in the manner described above.

Replacement of disk 14 into the recess 12 necessarily takes place in a reverse sequence, namely, the finger ear 52 must first be depressed until it engages the cam member 60 and then the finger ear 44 may be depressed until it engages the cam member 56, at which time the disk 14 will be recessed in its operating position. In accordance with a feature of this invention, the battery 22 will always be in its switched-off position when the disk 14 is removed from recess 12 or replaced into recess 12. Thus, the battery can never be removed when the disk is in its battery switched-on position, but rather, the battery must always be switched off before the disk can be removed from or replaced into the recess 12.

In accordance with a further feature of this invention, the disk 14 may be provided with a spring plate 80 illustrated in FIGURE 8 of the drawing. The spring plate 80 is contoured to conform to the peripheral edges of the disk 14 and is provided with a central aperture having an inwardly extending resilient finger 82. As shown in FIGURE 7, when the plate 80 is positioned against the rear wall of the disk 14, resilient finger 82 extends into the cavity 20. The resilient finger 82 will have no operative effect on the battery 22 when the disk 14 is in position within recess 12, but when the disk 14 is removed from the recess 12, the inwardly extending resilient finger 82 will cause the battery to pop out of the disk 14, thereby facilitating removal of the battery.

FIGURES 9, 10, and 11 show the construction of still another illustrative embodiment of the invention which embodies the unique and highly advantageous features of a combined switch and battery holder.

As shown in these figures, this embodiment of switch and battery holder may be utilized in the temple member 88 of an eyeglasses hearing aid wherein portions of the temple member are formed with recesses for receiving the hearing aid components, such as a microphone 90 and the battery support disk 92. The recesses are defined by three integrally formed side walls of the temple member housing and the remaining side wall is defined by a cover plate 94 which is adapted to be removably fastened to the housing by means of the screws 96.

In this embodiment of the invention, the battery support disk 92 is provided with a central cavity for receiving a battery 22, in the same manner as the battery support disk 14 shown in FIGURE 6. The peripheral edge of battery support disk 92 is formed at one side thereof with a central curved portion 98 having a finger ear 100 at one end and a lock ear 102 at its other end. The opposite side of the peripheral edge of battery support disk 92 is formed with a curved central portion 104 having a finger ear 106 at one end and a lock ear 108 at its other end, whereby the peripheral edge contours define a plurality of peripherally spaced cam members.

Electrical contact between the battery terminals at the opposite faces of battery 22 and the remainder of the hearing aid circuit is made by the power contacts 108 and 109 which are secured to housing 88 so as to engage the battery terminals when the battery support disk 92 is in the operating position. Contact 108 is shown as generally T-shaped with the leg thereof being secured to the rear wall of housing 88, as by the fastener 124. Contact 109 is shown as having a generally L-shaped portion 110 with one leg thereof being fastened to the front part of the housing, as by the screw 96, and a straight portion 112 fastened to the housing as by the screws 96 at each end thereof. The depending leg of the contact portion 110 advantageously is provided with a dimple or depression 122 to insure good electrical contact with the battery terminal.

Conveniently, the contact portion 110 of contact 109 may be integrally formed with the contact portion 112, or if desired, these two contact portions may be separately formed but mounted in abutting relation, as shown in FIGURE 10. Our highly advantageous feature of the straight contact portion 112 is the provision of considerable structural strength at the recess wall of the temple member housing 88. Thus, as shown in FIGURE 11 of the drawing, the contact portion 112 bridges the open portion of the battery holder recess between the screws 96 and therefore, serves to add structural strength and rigidity to this portion of the housing.

A further feature of the illustrative embodiment of the combined switch and battery holder shown in FIGURES 9, 10 and 11 is its simplicity of construction and operation. Thus, the battery support disk 92 may be inserted into its recess as shown in dotted line in FIGURE 10, and by the push button manipulation of the finger ears 100 and 106, the disk may be rocked back and forth about its phantom pivot as described heretofore, to switch the hearing aid either on or off. Further, when battery checking or replacement is desired, the support disk may be raised out of its recess as shown in full lines in FIGURE 10—an operation facilitated by the finger ears 100 and 106—and the locking cams 118 and 120 engage locking ears 102 and 108 to prevent the disk from becoming separated from the housing 88. Thus, the simplified disk arrangement of this embodiment like that of the previously described embodiment, has these three operating positions, namely, switch-on or switch-off when the disk is recessed, and battery replacement when the disk is pulled out of the recess. It will be appreciated from FIGURE 10 that the remainder of the hearing aid circuit (not shown) may be connected to the microphone 90 by means of the conductors 91 and 93, and to the combined switch and battery holder of this invention by means of the conductors 114 and 116.

It will be understood by those skilled in the art that the various combined switch and battery holders disclosed in the drawing and described in the several illustrative embodiments set forth above, are merely illustrative of the principles of the invention, and that changes may be made in the construction and arrangement of the parts without departing from the real spirit and purpose of the invention. Accordingly, it is intended to cover by the appended claims any modified forms of structure or use of the equivalents which may reasonably be included within their scope.

What is claimed as the invention is:

1. The improvement of a switch and battery holder assembly comprising the combination of a housing for electrical circuitry having a pair of opposed walls defining a recess therebetween, a battery holder positioned for sliding and pivotal movement within said recess, said battery holder being formed with a central aperture for receiving a battery and having a peripheral edge contoured to define a plurality of peripherally spaced cam members, a first power contact secured to one wall of the housing and adapted for electrical contact with one terminal of the battery, a second power contact secured to the other wall of the housing and adapted for electrical contact with the other terminal of the battery, and over-centered spring means secured to said battery holder and to said housing and cooperating with said peripherally spaced cam members on said battery holder for enabling said battery holder to be selectively positioned and positively held in its switch-on condition wherein both of said power contacts are in electrical contact with the battery terminals or in its switch-off condition wherein at least one of said power contacts is disengaged from its associated battery terminal, said over-centered spring means and said peripherally spaced cam members further serving to enable said battery holder to be selectively positioned and positively held in either its operating position within said recess or in its battery replacement position outside of said recess.

2. The improvement of a combination switch and battery holder comprising a housing defining a recess, a battery support disk adapted to be removably disposed within said housing recess, said disk having a central, outwardly-open cavity at one face thereof and an opening extending into said cavity at the opposite face thereof, the peripheral edge of said disk being particularly contoured to define a pair of peripherally spaced cam members, a pair of cam members positioned at opposed walls of said housing recess and adapted to operatively cooperate with said pair of peripherally spaced cam members on said disk, and over-centered spring means secured to said disk and said housing for facilitating pivotal operation of said disk to either a switch-on or a switch-off position within said recess and for facilitating the selective insertion of the disk into the recess or removal therefrom, the upper surfaces of said peripherally spaced cam members cooperating with the upper surfaces of the housing recess cam members for limiting the pivotal movement of the disk in either its switch-on or switch-off positions, the lower surfaces of said peripherally spaced cam members cooperating with the lower surfaces of said housing recess cam members to lock the disk to the housing when the disk is removed from the recess for battery replacement.

References Cited in the file of this patent

UNITED STATES PATENTS

| | | |
|---|---|---|
| 2,882,348 | Erickson | Apr. 14, 1959 |
| 2,907,810 | Detwiler et al. | Oct. 6, 1959 |
| 2,916,538 | Rose | Dec. 8, 1959 |
| 2,930,857 | Hollingsworth | Mar. 29, 1960 |

FOREIGN PATENTS

| | | |
|---|---|---|
| 114,064 | Sweden | May 22, 1945 |